United States Patent [19]

Buttner

[11] 4,450,881
[45] May 29, 1984

[54] ROLLER TABLE FOR WOODWORKING MACHINES

[75] Inventor: Kurt Buttner, Oberkochen, Fed. Rep. of Germany

[73] Assignee: Okoma Maschinenfabrik GmbH, Fed. Rep. of Germany

[21] Appl. No.: 511,721

[22] Filed: Jul. 8, 1983

Related U.S. Application Data

[63] Continuation of Ser. No. 217,924, Dec. 18, 1980, abandoned.

[30] Foreign Application Priority Data

Dec. 20, 1979 [DE] Fed. Rep. of Germany ....... 2951355

[51] Int. Cl.³ .............................................. B27F 5/00
[52] U.S. Cl. ....................................... 144/84; 83/437; 83/468; 83/520; 83/581; 144/2 R; 144/198 R
[58] Field of Search ................. 83/411, 418, 421, 437, 83/473, 474, 477, 477.2, 468, 581, 522; 144/2 R, 82, 84, 85, 134 A, 198 R, 200, 203, 3 R

[56] References Cited

U.S. PATENT DOCUMENTS 2,343,097 2/1944 Taylor .................................. 144/84
4,331,191 5/1982 Buttner ................................ 144/84

FOREIGN PATENT DOCUMENTS 1628864 12/1972 Fed. Rep. of Germany ..... 144/3 R
1453270 12/1973 Fed. Rep. of Germany ..... 144/3 R Primary Examiner—W. D. Bray
Attorney, Agent, or Firm—William A. Drucker

[57] ABSTRACT

This invention relates to a roller table for woodworking machines, especially for tenoning and slot mortising machines for the manufacture of window frames, which can be moved in translation along a straight guideway and which is provided, at the end facing away from the guideway, with a longitudinal adjustable supporting plate for the overhanging end of the workpieces.

15 Claims, 6 Drawing Figures

ROLLER TABLE FOR WOODWORKING MACHINES

This application is a continuation of application Ser. No. 217,924, filed Dec. 18, 1980, abandoned.

BACKGROUND OF THE INVENTION

The invention relates to a roller table for woodworking machines, especially for tenoning and slot mortising machines for the manufacture of window frames, which can be moved in translation along a straight guideway and which is provided, at the end facing away from the guideway, with a longitudinal adjustable supporting bar for the overhanging end of the workpieces.

PRIOR ART

Known roller tables of this kind, used inter alia in conjunction with such tenoning and slot mortising machines for the manufacture of window frames, have longitudinal profiling spindles fitted to follow the tenoning and mortising spindle or spindles. With such machines, the window frame clamped to the roller table is transported with its front face past the tool of the tenoning and mortising spindle and is then passed at right angles to the workbench for longitudinal profiling.

However in practice it is often necessary when manufacturing window frames to miter the tenons and mortises, that is to say, to cut them at a certain angle.

For this purpose, particular mention should be made of tenoning and slot mortising machines for which stops and/or guides for the workpiece are fitted to the surface of the roller table and are adjustable according to the mitered angle to be cut and can be secured in the appropriate position.

A disadvantage of this known arrangement is that, even with slightly larger adjustment angles, the free ends of the workpieces are no longer able to rest on the longitudinally adjustable supporting bar connected to the roller plate, but project sideways beyond it so that they can no longer be borne by the supporting bar. The result is that, during the manufacturing process, the window frames bend downwards beyond the roller table, giving rise to deformations and/or oscillations during the working process so that clean finishing of the ends of the window frames ceases to be possible.

However, an increase in the size of the supporting bar would lead to a considerable increase in the weights to be moved together with the roller table, and would thus represent an unjustifiable expense; in addition, the accessibility of the roller table would be impaired, with the result that, unless the supporting bar were to be detached or moved inwards, the operator would be unable to reach the equipment on the roller table for clamping the workpieces.

OBJECT OF THE INVENTION

Accordingly, the object of the invention is to provide a roller table of the type described above with which miter angles can be adjusted in simple manner over a wide range and with such satisfactory processing of the workpieces is also possible at larger adjustment angles.

SUMMARY OF THE INVENTION

In accordance with the invention, this object is achieved in that the roller table consists of a rolling unit running along the straight guideway and of a table plate carrying the longitudinally adjustable supporting bar which is fitted so that it can pivot to the surface of the rolling unit and can be secured in the required position relative to the rolling unit.

This arrangement enables the required mitered angle to be set by simple pivoting of the table plate relative to the rolling unit, without the window frame being produced having to leave the supporting bar. Indeed, in any set position, the free end of the window frame rests on the supporting bar of the roller table so that, even when mitered angles are being cut, satisfactory machining by means of the tenoning and mortising tools is possible.

A further advantage of the layout according to the invention is that, in spite of the fact that the angle adjustment may be made as required, the clamping equipment on the table plate always remains accessible, with the result that operation of the machine is not hindered.

Advantageous seating of the table plate on the surface of the rolling unit is obtained if provision is made for a large diameter pivot securely fixed to the plate of the rolling unit and located above a supporting surface for the table plate projecting beyond the surface of the plate and coaxial with the table plate, this pivot engaging so that it can rotate in a corresponding recess in the table plate, while on the side of the rolling unit facing away from the machine, a second supporting surface is provided which serves to support the end of the pivotable table plate facing away from the machine. It is desirable that the second supporting surface be curved in an arc, resulting in the corresponding underside of the table plate sliding on both supporting surfaces during the pivoting movement. The second supporting surface is intended to support the weight resulting from the overhanging of the table plate or of the supporting bar and from the workpiece.

To permit simple and accurate securing of the table plate in the various set positions relative to the rolling unit surface, it is advantageous if the table plate is provided with a circular recess into which are inserted at least two diametrically opposed arc-shaped segments which do not project beyond the surface of the table plate and which can be clamped against the plate of the rolling unit by means of bolts passing through the plate of the rolling unit making use of a clamping plate connected to the table plate. In this way, after the bolts have been slackened off, the table plate can easily be rotated around the central pivot and secured in any desired set position by tightening the bolts. For this purpose, it is desirable to provide rocking levers on the underside of the plate of the rolling unit to permit quick-action clamping.

It is an advantage if the segments are formed with a stepped cross-section and have an upper part which overlaps the clamping plate. In addition, a circular insert plate can be placed between the upper parts of the segments which fills the space between the segments, whereby a circular groove is formed between the insert plate and the clamping plate on the one hand and the recess in the table plate on the other hand. The insert plate and the clamping plate can also be formed in one piece, and accordingly, be provided on their circumferences with a step corresponding to the step in the segments.

It has been found to be an advantage if the segments are of a length corresponding to an arc of about 30° because, by this means, on the one hand, a segment is obtained of a size which enables an adequate clamping force to be applied, and on the other hand, a slight movement of the segments within the groove is possible without increased friction.

The segments, the insert plate and the clamping plate can with advantage be countersunk into the underside of the table plate. It is desirable that the top of the pivot is covered by a cover plate inserted in a recess in the surface of the table plate and flush with it, so as to exclude dirt, the cover plate being joined to the pivot. In this connection, it is an advantage if the cover plate is in the form of a scale plate carrying divisions from which the angular position of the table plate relative to the rolling unit can be read off at any time. The scale plate can also, if required, be in the form of a graduated ring with a central insert plate.

The closer the workpiece can be brought from the right-angle position towards the tool even at larger adjustment angles, the smaller are the oscillations occuring in the workpiece during treatment. For this reason, it is an advantage if the roller table in accordance with the invention can, even when the table plate is swung round, be brought as close as possible to the tool, especially a milling tool. For this purpose, it is advantageous if the edges of the table plate facing the machine are rounded and preferably given a curvature the center point of which coincides with the pivoting axis of the table plate.

However, this cannot always be fully achieved because most clamping devices have to be so rigidly secured that a projecting edge of the table plate is still necessary to support them on the side facing the machine. In order nevertheless to meet the above-mentioned requirements, the invention further provides the guide groove formed on the one hand by the recess in the table plate and on the other hand by the insert or clamping plate to be of such a shape that, in the case of a pivoting movement from the 90° position, the table plate moves away from the machine. In this way, the projecting corner is retracted without the approach to the tool being adversely affected at small setting angles. Even though satisfactory operation can take place at small setting angles, that is to say in the immediate vicinity of the tool, such a projecting corner cannot come into contact with the tool with this arrangement.

Such a guide is preferably so formed that, in the 90° position of the table plate, the groove has a part facing the machine which is approximately in the shape of an elongated oval, whereas on the side facing away from the machine, the connecting part between the two segments is shortened. In this connection, care must be taken that, in all pivoting positions, the diagonal distance between all points of the guideway corresponds to the distance between the two segments.

BRIEF DESCRIPTION OF THE DRAWINGS

The invention is described in greater detail below with the aid of examples of embodiments shown in the drawings.

In the drawings.

DESCRIPTION OF THE PREFERRED EMBODIMENTS

Figure 1:
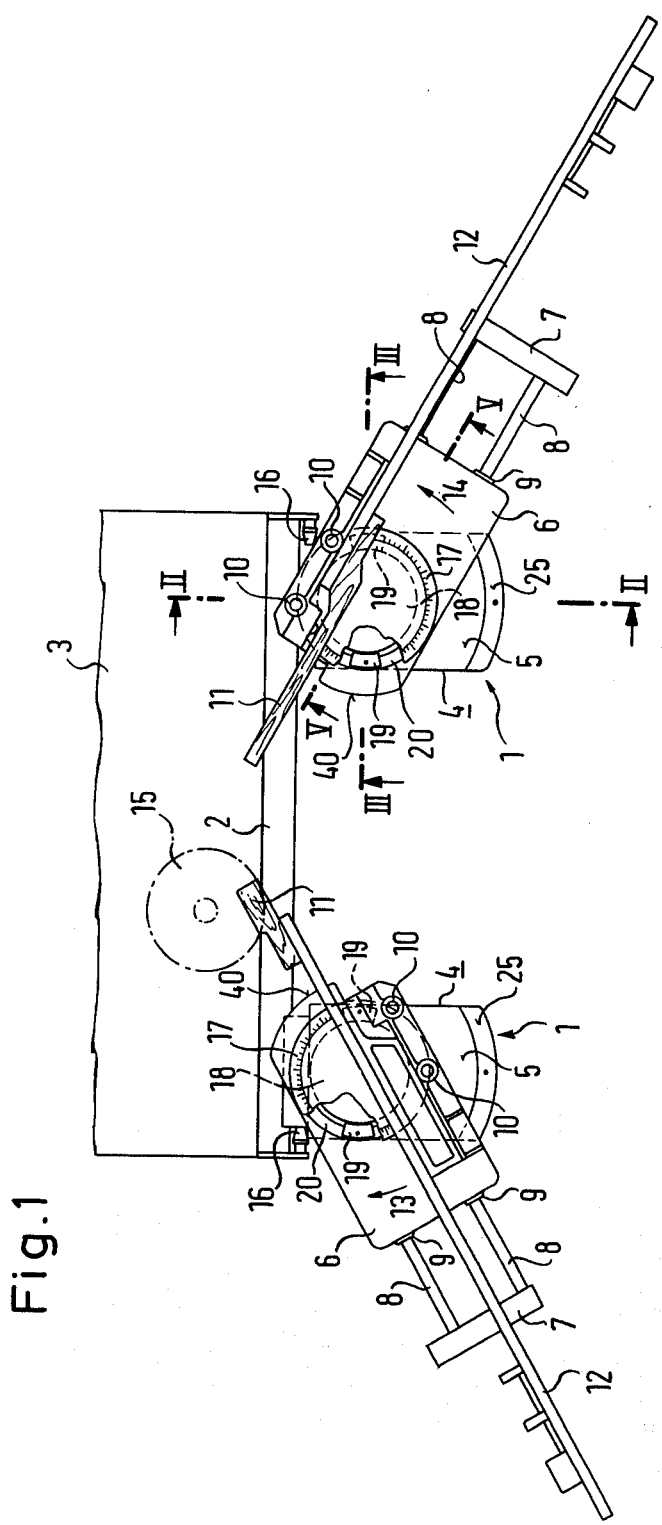
FIG. 1 shows a view from above of an embodiment of the roller table in accordance with the invention.

As shown in FIG. 1, the roller table 1 formed in accordance with the invention consists of a rolling unit 4 running along a straight guideway 2 of a woodworking machine 3 and of a table plate 6 fitted so that it can pivot to the surface 5 of the rolling unit and which can be secured in the required position relative to the rolling unit 4. A longitudinally adjustable supporting bar 7 is fitted to the table plate 6 and, in the example shown, is provided with two guide rods 8 which engage in corresponding guideways 9 in the table plate and are longitudinally adjustable therein. In addition, the table plate 6 is provided with clamping devices 10, a wooden locking bar 11 and a stop bar 12, all in the usual manner.

In the example illustrated, on the left of FIG. 1, there is a second similarly designed roller table 1, the table plate 6 of which is pivoted in the direction of the arrow 13, while the table plate of the roller table shown on the right of FIG. 1 is pivoted in the opposite direction, that is to say, in the direction of the arrow 14.

A processing tool of the woodworking machine 3 is shown symbolically and is designated 15. The ends of the guideway 2 are fitted with stops 16 for the roller table.

A graduated ring 17 is let into the surface of the table plate 6 and is provided with an insert plate 18 flush with the surface of the graduated ring. The graduated ring 17 and the insert plate 18 form a cover plate 31 (cf. FIG. 2) aligned with the surface of the table plate 6 and they can also be made as a single unit.

In the interests of greater clarity, the graduated ring 17 and the insert plate 18, together with the corresponding recesses, are shown larger in FIG. 1 than in the other drawings.

Arc-shaped segments 19 are provided in the vacinity of the underside of the table plate 6 for the purpose of securing the table plate in the required set position in the manner to be described later herein and are shown in FIG. 1 in a partly opened-up representation of the table plate 6.

The segments 19 are located in a groove 22 formed between a recess 20 in the table plate 6 and an insert plate 21 and are rigidly secured relative to the rolling unit 4 by bolts 23 which serve for the purpose of tightening the segments and thereby locking the table plate 6. When the segments are slackened off, however, they can move in the groove 22 when the table plate 6 is rotated.

The table plate 6 is mounted on a first supporting surface 24 (cf. FIG. 2) lying coaxially to the pivoting axis of the table plate and that end of it which faces away from the machine 3 is also supported on a second supporting surface 25, which is curved in the shape of an arc, of the rolling unit 4 in such a way that the torque produced by the supporting bar 7, the overhanging parts of the table plate and the workpieces, is overcome.

Figure 2:
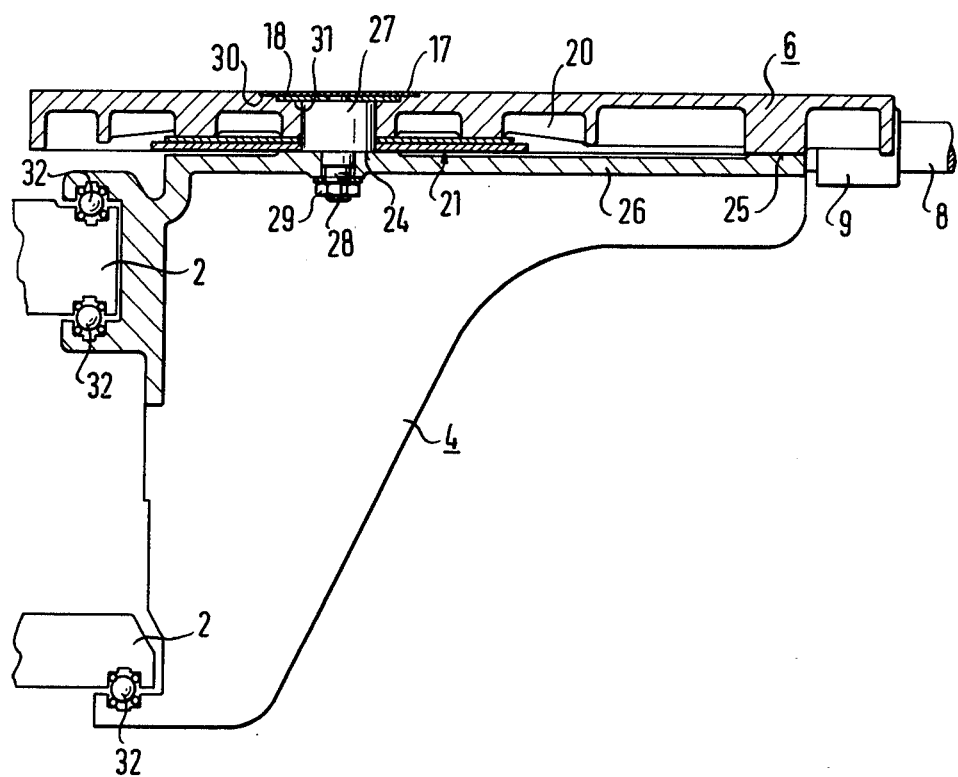
FIG. 2 is a section on the plane II—II of FIG. 1 with the table plate lying at right angles to the roller table guide.

FIG. 2 is a section at II—II of FIG. 1 with the table plate 6 lying at right angles to the guideway 2. As may be seen from FIG. 2, the table plate 6 is rotatably mounted on the surface of the rolling unit 4 by means of a pivot 27 connected to the plate 26 of the rolling unit, the pivot 27 being of large diameter to ensure satisfactory movement. The pivot 27 has an integral bolt 28 with which, using a nut 29, it can be screwed to the plate 26 of the rolling unit.

The pivot 27 is arranged coaxially with the first supporting surface 24 in such a way that the table plate 6 in the region of the pivot 27 can rest on this supporting surface 24. Recesses 38 and 39 (cf. FIG. 5) are provided coaxially with the pivot and serve to receive an intermediate plate 31 and the cover plate 31 made up of the graduated ring 17 and the insert plate 18 which has already been described.

In other respects, the rolling unit is formed in the usual manner and moves along the guideway 2 with the aid of ball bearings 32.

Figure 3:
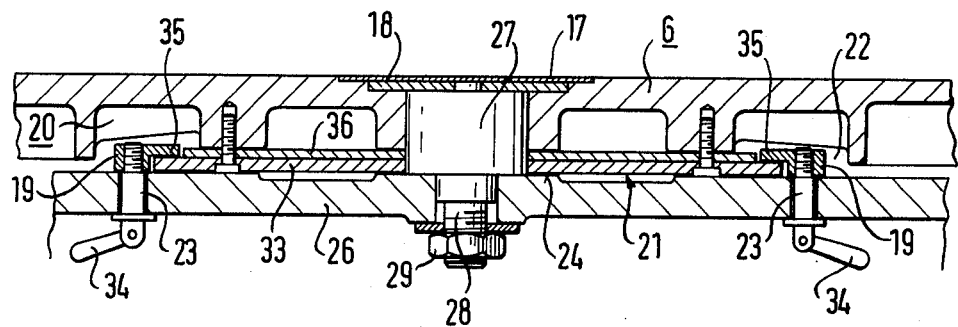
FIG. 3 is a part section on the plane III—III of FIG. 1.

FIG. 3 is a part section III—III of FIG. 1 and shows in detail the arrangement and form of the clamping segments and of the components corresponding thereto. As may be seen from FIG. 3, the clamping segments 19 can be clamped against the plate 26 of the rolling unit by means of the bolts 23 passing through the plate 26 of the rolling unit 4, making use of a clamping plate 33 connected to the table plate 6. This clamping can be effected in the usual manner by means of rocking levers 34 which can form the nuts and/or the heads of the bolts 23. As depicted, the clamping plate 33 is screwed from beneath against the table plate 6.

Figure 4:
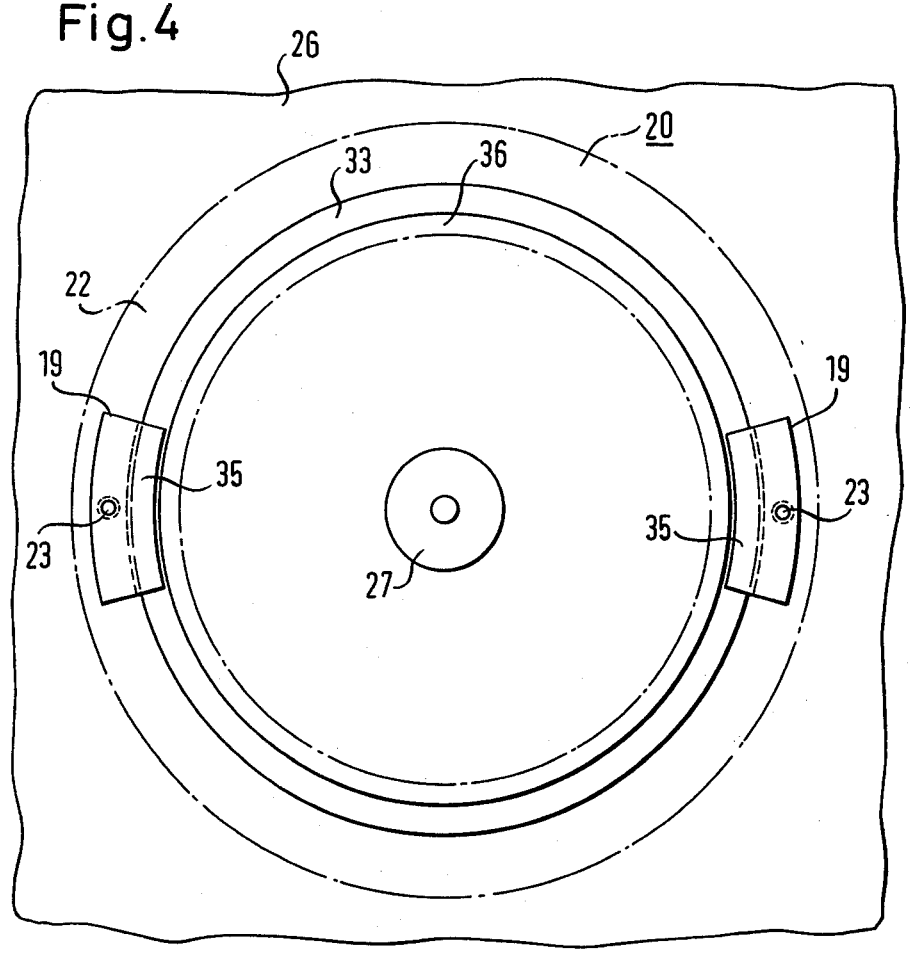
FIG. 4 is a view from above of the arrangement in accordance with FIG. 3.

In the example shown in FIGS. 3 and 4, the segments 19 are formed with a stepped cross-section and have an upper part 35 which overlaps the clamping plate 33. In addition, a circular insert plate 36 is placed between the two upper parts 35 which fills the space between the clamping segments so that, between the recess 20 in the table plate 6 (cf. also FIG. 1) and the two plates 33 and 36, there can be formed the circular groove 22 which has already been described in connection with FIG. 1 and in which the segments 19 can slide. The insert plate 36 and the clamping plate 33 can also be formed in one piece and, accordingly, be provided on their circumferences with a step corresponding to the step in the segments 19.

Figure 5:
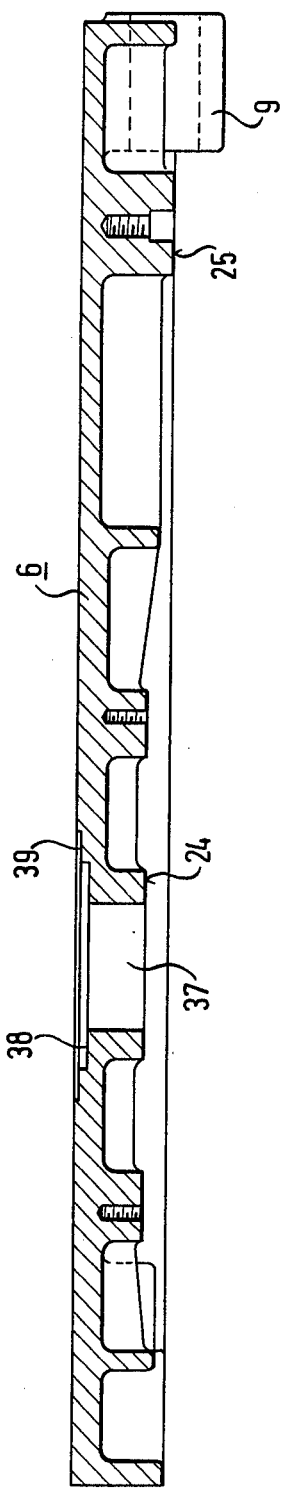
FIG. 5 is a section on the plane V—V of FIG. 1 through the base unit of the table plate.

FIG. 5 is a section at V—V of FIG. 1 through the base unit of the table plate 6 and shows, in particular, the recess 37 for the pivot 27 and recesses 38 for the intermediate plate and 39 for the graduated ring and its insert plate.

In the version shown in FIG. 1, the edges of the table plate 6 facing the machine are rounded as at 40 in order that the workpiece can be brought as close as possible to the tool 15 in the manner described and, together with the table plate, does not come into contact with the tool. However, because it is in many cases necessary, in order to ensure secure clamping, to retain at least one projecting corner, this rounding can be used for pivoting to one side only.

Figure 6:
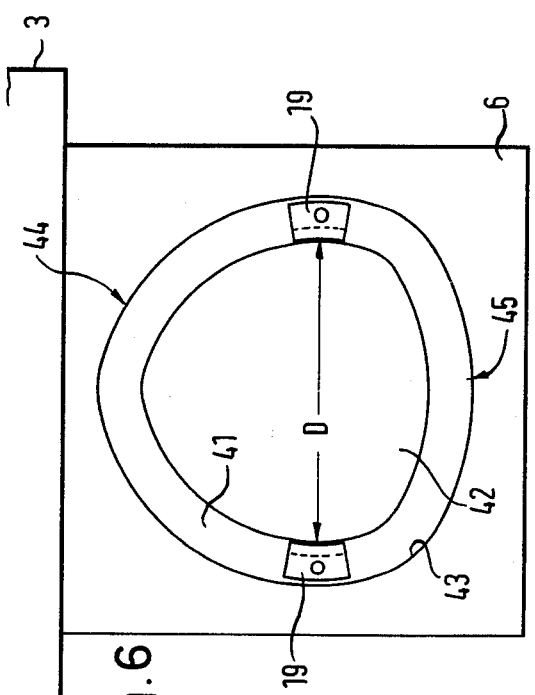
FIG. 6 is a view from above similar to FIG. 4 of a modified embodiment.

FIG. 6 shows a version in which, in the case of a pivoting movement from the right-angled position, the table plate moves away from the machine 3. For this purpose, the guide groove 41 formed between the insert and clamping plate 42 and the recess 43 in the table plate 6 is formed in such a way that, in the 90° position of the table plate 6, the groove has a part 44 facing the machine which is approximately in the shape of an elongated oval - as shown in FIG. 6 - whereas on the side facing away from the machine 3, the connecting part 45 between the two segments 19 is shortened. Furthermore, the groove is so shaped that, in all pivoting positions, the diagonal distance D between all points of the guideway corresponds to the distance between the two segments 19.

I claim:

1. In a roller table for a woodworking machine having:
   (i) a rolling unit for rolling along a straight guideway of the machine,
   (ii) a pivot member on said rolling unit having an axis,
   (iii) a table plate engaged on said pivot member and rotatable with respect to said rolling unit about said axis,
   (iv) a supporting bar, for supporting an overhanging end of a workpiece, engaged slidably with said table plate for longitudinal movement radially with respect to said axis, the improvement which comprises:
   (a) said rolling unit having a support plate carrying said pivot member, said support plate having an upper first support surface about said axis,
   (b) said table plate extending radially beyond said first support surface and including means defining a recess,
   (c) said pivot member being rotatably engaged in said recess,
   (d) said table plate extending over said first support surface,
   (e) said support plate having an upper second support surface spaced radially from said first support surface and abutted by said table plate, and
   (f) securing means for acting between said support plate and said table plate for securing said table plate in a selected position of rotation about said pivot axis with respect to said support plate.

2. A roller table, as claimed in claim 1, wherein said second supporting surface is curved in an arc about said pivot axis, and said table plate is slidable on said first and second supporting surfaces.

3. A roller table, as claimed in claim 1, wherein said table plate has means defining a circular groove, and further comprising two arc-shaped clamping segments disposed at diametrically opposed positions in said groove, a clamping plate placed at the underside of the table plate, and respective bolts engaged through said support plate and connected to said clamping segments for clamping said segments against said clamping plate.

4. A roller table, as claimed in claim 3, including rocking levers on said bolts.

5. A roller table, as claimed in claim 3, wherein said clamping segments include an upper part which overlies said clamping plate.

6. A roller table, as claimed in claim 5, comprising a circular insert plate secured between said clamping plate and said table plate and disposed between said upper parts of said opposed segments.

7. A roller table, as claimed in claim 6, wherein said insert plate and said clamping plate are formed in one piece.

8. A roller table, as claimed in claim 3, wherein said clamping segments have an arcuate length corresponding to an arc of about 30°.

9. A roller table, as claimed in claim 6, wherein said table plate has means defining an underside recess, and wherein said segments, said insert plate, and said clamping plate are disposed in said recess.

10. A roller table, as claimed in claim 1, wherein said table plate has means defining an upperside recess, and further comprising a cover plate inserted in said recess and covering said pivot member, said cover plate being joined to said pivot member and lying flush with the upper surface of said table plate.

11. A roller table, as claimed in claim 10, wherein said cover plate bears graduations for indicating angular position of said table plate relative to said rolling unit.

12. A roller table, as claimed in claim 11, wherein said cover plate includes a ring having said graduations, and a central insert plate.

13. A roller table, as claimed in claim 1, wherein said table plate has edges which, when in use, face a working tool of said machine, said edges having a curvature coaxial with said pivot axis.

14. A roller table, as claimed in claim 1, wherein said table plate has means defining a closed-loop non-circular groove, and further comprising two clamping segments disposed at opposite positions in said groove, a clamping plate secured at the underside of said table plate, and respective bolts engaged through said support plate and connected to said clamping segments for clamping said segments against said clamping plate, said groove being of such shape that rotation of said table plate with respect to said support plate results in a translatory motion of the table plate along a line normal to the line of rolling of the rolling unit.

15. A roller table, as claimed in claim 14, wherein the shaping of said groove is such that:
  (i) it includes a first portion, nearer to the working tool of the machine, which is approximately in the shape of two segments of an elongated oval,
  (ii) it includes a second portion, more remote from the working tool of the machine, which connects said two segments of the elongated oval, and
  (iii) for all positions of rotation of said table plate with respect to said support plate, the separation of the parts of said groove occupied by said clamping segments remains the same.

* * * * *